July 5, 1966   A. KATCHMAN   3,259,816
ELECTRICAL CAPACITOR WITH A PLASTIC DIELECTRIC
Filed July 12, 1963   2 Sheets-Sheet 1

Inventor,
Arthur Katchman,
by Sidney Greenberg
His Attorney.

Inventor,
Arthur Katchman,
by Sidney Greenberg
His Attorney.

United States Patent Office 3,259,816
Patented July 5, 1966

3,259,816
ELECTRICAL CAPACITOR WITH A PLASTIC DIELECTRIC
Arthur Katchman, Glens Falls, N.Y., assignor to General Electric Company, a corporation of New York
Filed July 12, 1963, Ser. No. 294,512
1 Claim. (Cl. 317—247)

The present invention relates to electrical capacitors, and more particularly to electrical capacitors incorporating dielectric resin films which confer improved electrical properties thereon, especially under conditions of elevated temperature.

As is well known in the art, dielectric films of low power factor are desirable in capacitors to avoid energy loss and excessive heat generation in the capacitor which otherwise would cause undue shortening of the life of the capacitor. While various types of dielectric materials are known which may have satisfactory power factor properties at normal operating temperatures, the conventional dielectrics do no retain their low power factors under conditions of elevated temperature e.g., 80–100° C. and above. Furthermore, known dielectric materials which may have satisfactory power factor characteristics are often deficient in other properties, such as having relatively low dielectric constant, and consequently unduly limiting the capacitance of the capacitor unit.

It is an object of the invention to provide electrical capacitors with dielectric material, especially in the form of spacer films, which confers improved electrical properties thereon, especially low power factor coupled with satisfactory dielectric constant, under conditions of elevated temperature.

It is another object of the invention to provide capacitors with a synthetic resin dielectric material in the form of coatings, films, and the like which impart the above-mentioned improved properties to the capacitors.

Other objects and advantages will become apparent from the following description taken in conjunction with the accompanying claims.

With the above objects in view, the present invention relates to an electrical capacitor comprising a pair of electrodes separated by dielectric material comprising a phthalate polyester of a bis (hydroxyphenyl) alkane wherein the alkane group contains from 1–5 carbon atoms and the phthalate radical of the polyester is from 50–100 mole percent isophthalate and from 50–0 mole percent terephthalate radicals.

Figure 1:
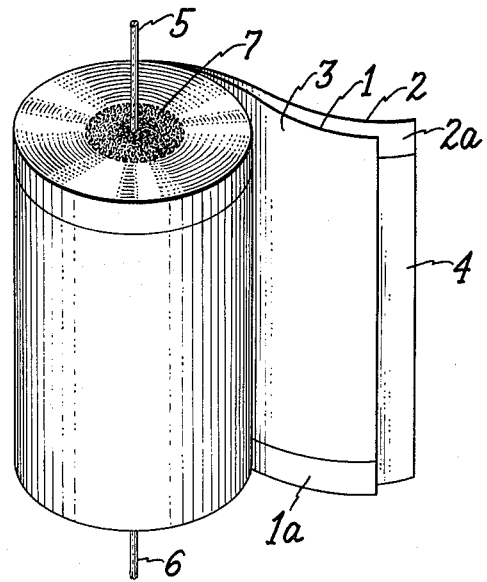
Figure 2:
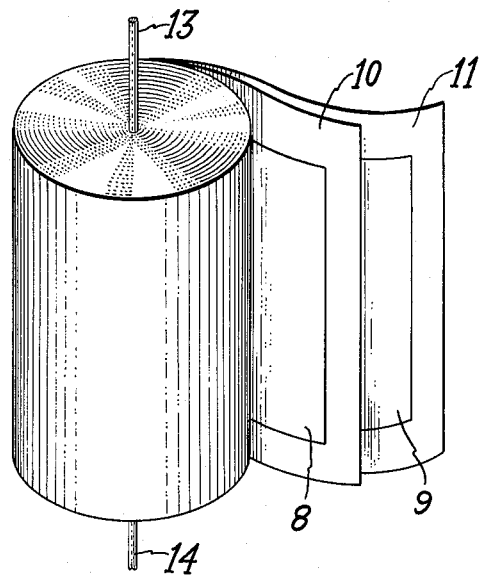
Figure 3:
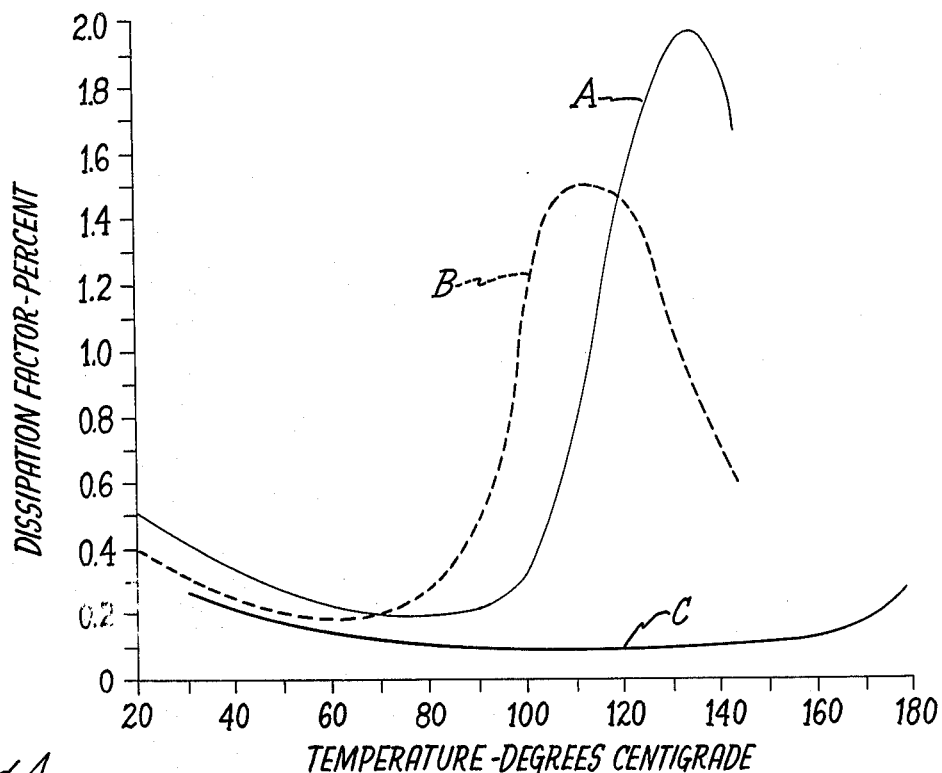
Figure 4:
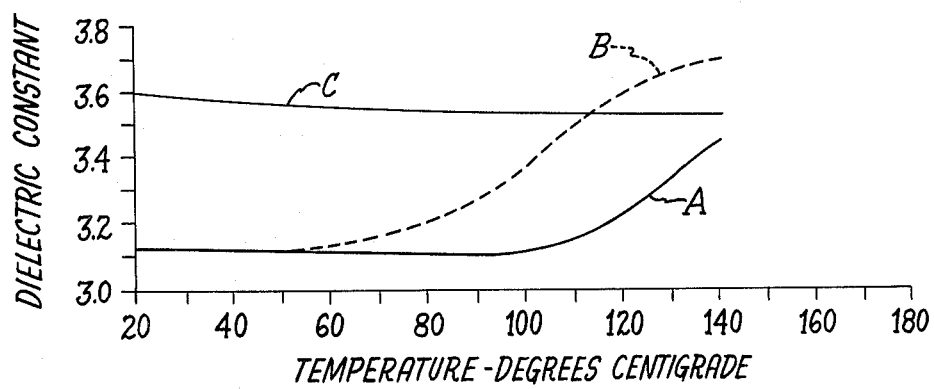

The invention will be better understood from the following description taken in conjunction with the accompanying drawings, in which:

FIGURE 1 illustrates an electrical capacitor incorporating an improved dielectric material in accordance with the present invention;
FIGURE 2 illustrates a different embodiment of electrical capacitor incorporating the improved dielectric material;
FIGURE 3 graphically illustrates the superior dissipation factor properties of a capacitor constructed in accordance with the invention; and
FIGURE 4 is a graphical illustration of the superior dielectric constant properties of a capacitor constructed in accordance with the invention.

Referring now to the drawing, and particularly to FIGURE 1, there is shown a roll type capacitor in which the invention may be embodied. The capacitor comprises a pair of convolutely wound electrode foils 1 and 2 of suitable metal, e.g., aluminum, each foil being coated with a dielectric film 3 and 4 typically 1 mil thick and of a composition more fully described hereinafter. The dielectric films 3, 4 preferably are offset from opposite edges of the respective foils 1 and 2 so as to leave exposed metal margins 1a, 2a. Terminals 5, 6 are electrically connected to the opposite foil edges by a metal connection 7 produced by a Schooping, soldering or other suitable process, as well known in the art. If desired, the capacitor may be further treated with dielectric impregnants of various types, such as mineral oil, polyisobutylene, or other known capacitor impregnant material.

In a different form of capacitor as shown in FIGURE 2, the wound capacitor comprises a pair of convolutely wound electrode foils 8, 9 insulated from each other by separate sheets 10, 11 of dielectric material of the composition hereinafter described. Electrical contact with electrode foils 8, 9 is made by terminal leads 13, 14 of electrically conducting material which are applied to the respective foil electrodes and project from opposite ends of the wound capacitor section.

If desired, the wound capacitor sections shown in FIGURES 1 and 2 may be suitably enclosed in a casing (not shown) containing a suitable dielectric liquid or other impregnant such as mentioned hereinabove.

The dielectric spacer material separating the capacitor electrodes is composed of a phthalate polyester of bis (hydroxyphenyl) alkane wherein the alkane group contains from 1–5 carbon atoms and the phthalate radical of the polyester is from 50 to 100 mole percent isophthalate and from 50–0 mole percent terephthalate radicals. This polymer is at hermoplastic material with a softening range well over 200° C.

The following shows the structural formula of the polyester material, with the recurring unit enclosed in brackets, where the bisphenol is 2,2-bis(4-hydroxyphenyl)-propane and the phthalic acid is isophthalic acid:

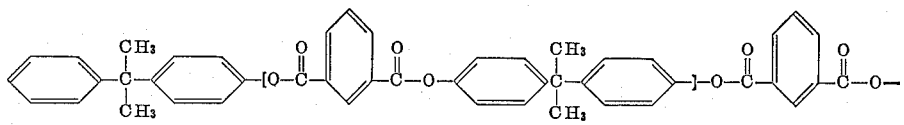

Examples of the bis(hydroxyphenyl)alkanes, hereinafter referred to as bisphenols for brevity, which I may use in the preparation of the polyesters are the bisphenols having the formula

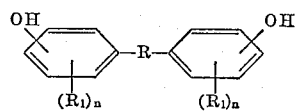

where $n$ is one of the integers 0, 1, 2 and $R_1$ is a lower alkyl radical, e.g., from 1 to 8 carbon atoms, and preferably from 1 to 4 carbon atoms, and where R is a divalent saturated aliphatic group, i.e., alkylene or alkylidene radical, having from 1 to 5 carbon atoms.

These bisphenols may be described as bis(hydroxyphenyl)alkanes having from 0 to 2 lower alkyl substituents on the phenyl nucleus. Specific examples of $R_1$ are methyl, ethyl, propyl, isopropyl, butyl, secondary butyl, tertiary butyl, the isomeric hexyl, heptyl, and octyl radicals, etc. Specific examples of radicals which R may be are methylene, ethylene, ethylidene, propylene, propylidene, isopropylidene, 1,4-butylene, 1,3-butylene, 2,3-butylene, 2-methylpropylidene, 2,2-butylidene, the pentylenes, e.g., 1,2-, 1,3-, 2,4-pentylenes, etc., the pentylidenes, e.g., 1,1-, 2,2-, 3,3-pentylidenes, etc., the isopentylidenes, etc., diethylmethylene, methylpropylmethylene, etc. Since those bisphenols in which both hydroxyphenyl groups are on the same carbon atom of the alkane group are easiest to prepare and make readily available, I prefer that R be an alkylidene group. The hydroxyl group may be in any of the positions ortho, meta or para with respect to R. However, those bisphenols with the OH groups in the meta positions are extremely difficult to prepare and those with the OH groups in the o-positions are more difficult to prepare than those with the OH groups in the para position. Therefore, I prefer to use those bisphenols with the OH groups in the para position with respect to R, e.g., the bis(p-hydroxyphenyl)alkanes. Typical examples of the bisphenols which may be used are the bis(hydroxyphenyl)methanes, 1,1 - bis(hydroxyphenyl)-ethanes, the 1,2-bis(hydroxyphenyl)ethanes, the 1,1-bis-(hydroxyphenyl)propanes, the 2,2-bis(hydroxyphenyl)-propanes, the 1,1-bis(hydroxyphenyl)butanes, the 1,2-bis(hydroxyphenyl)butanes, the 1,3-bis(hydroxyphenyl)-butanes, the 1,4-bis(hydroxyphenyl)butanes, the 2,3-bis-(hydroxyphenyl)butanes, the 2,2-bis(hydroxyphenyl)butanes, the 3,3-bis(hydroxyphenyl)pentanes, etc., including those where the phenyl group has from 1 to 2 alkyl substituents having from 1–8 carbon atoms, for example, 2,2 - bis(2,6-dimethyl-4-hydroxyphenyl)propane, 2,2-bis-(2,6 - diethyl - 4 - hydroxyphenyl)propane, 2,2 - bis(2,4-dioctyl - 6 - hydroxyphenyl)propane, 1 - (2 - methyl-4-hydroxyphenyl) - 1 - (4-ethyl-6-methyl - 2 - hydroxyphenyl)ethane, 1,2 - bis(2-propyl-6-hexyl-4-hydroxyphenyl)-ethane, 2,3-bis(2-t-butyl-4-hydroxyphenyl)pentane, 1,4-bis(4-isoamyl-2-hydroxyphenyl)butane, etc. Because it is readily available at low cost, I prefer to use 2,2-(4-hydroxyphenyl)propane.

The polyesters may be prepared using any material or mixture of materials from each of the two groups of components of the polyester resins of the present invention, and any of the resulting resins are able to meet the physical, chemical, electrical and thermal properties which are required for use at temperatures of at least 155° C. for indefinite periods of time. However, a preferred method of making the polyesters of this invention is to use the bisphenol either in the form of its preformed lower alkyl monocarboxylic acid esters wherein the hydroxyl groups of the bisphenol are esterified, for example, the diacetate of the bisphenol, or to form the ester in situ by the use of the anhydride of the lower alkyl monocarboxylic acid in the presence of an inert solvent, preferably the same solvent which is to be used for forming of the polyester. The alkyl esters of the bisphenol are reacted with isophthalic acid which may contain up to 10 mole percent of terephthalic acid based on the total weight of isophthalic and terephthalic acids, using as the solvent an inert organic liquid having a boiling point of from 210–280° C., preferably from 240°–260° C. Ideal solvents for this reaction are diphenyl, diphenyl ether, naphthalene, and their halogenated or hydrogenated derivatives. Since the halogenated derivatives offer little advantage over diphenyl or diphenyl ether, the use of the latter two as the solvent is preferred.

As will be readily apparent to those skilled in the art, it is highly desirable, in order to obtain the best polymer properties, that the polyester be an essentially neutral polyester, i.e., contains essentially no unesterified hydroxyl or carboxyl groups, especially the latter. To obtain an essentially neutral polyester the proportions of the reactants are so chosen that for each carboxyl group present in the isophthalic and terephthalic acids there are from 1 to 1.05 hydroxyl groups present in the bisphenol. Any excess hydroxyl groups within these limits do not detract from the properties of the polymer since they will be present as the lower alkyl monocarboxylic acid ester of the starting material.

The reaction is carried out at a temperature sufficiently high that the polymer does not precipitate from the solution. Temperatures of from 210° C. up to the reflux temperature of the reaction mixture are advantageous. It is most convenient to use the reflux temperature. This heating is continued until no more of the lower alkyl monocarboxylic acid which is initially esterified with the bisphenol is expelled from the reaction mixture. Preferably, the reaction is carried out in an inert atmosphere, for example, an atmosphere of nitrogen, to exclude any oxidation of the resin while at this elevated temperature. After essentially all of the lower alkyl monocarboxylic acid is expelled, the reaction is continued until the desired viscosity of the resin is obtained, indicating that the desired degree of polymerization has been attained. In general, up to 90% of the lower alkyl carboxylic acid will have been expelled in about 1 to 4 hours depending on the batch size, and the reaction is continued for as much as an additional 20 hours to obtain a very high molecular weight polymer. In general, the higher the molecular weight of the polymer, the more satisfactory it will be as capacitor dielectric material; so if desired, longer heating periods may be used.

In general it is very convenient to use enough solvent so that the resulting polyester solution at the end of the reaction contains 60 weight percent of the polyester in the solvent. Higher or lower amounts of solvent may be used, but it has been found that this is the convenient proportion to use, since the resulting solution at the reaction temperature is not so viscous that decomposition will occur due to poor heat transfer. Furthermore, with this concentration of polyester, the diphenyl or diphenyl ether does not have to be removed from the resin to use in coating processes as hereinafter described. When diphenyl is used as the reaction solvent in the amount of 40% of the total weight of diphenyl and resin, a sample diluted to 10 percent resin solids with cresol will have a sufficiently high molecular weight when such a solution has a viscosity of at least 200 centistokes at 25° C. and preferably from 550 to 650 centistokes at 25° C. Higher concentration of biphenyl in the solution appears to lower the viscosity. The polyester resin whose solution in the range of 550 to 650 centistokes at 25° C., will have an intrinsic viscosity in the range of from 0.4 to 0.65.

When the desired viscosity is reached, the reaction mixture is permitted to cool to a temperature where the solution is still homogeneous, i.e., no polymer has precipitated, for example, in the range of from 140° C. up to the boiling point of the solvent which is added to give a final composition containing 15 to 20 percent resin solids. Suitable solvents are o-, m-, or p-cresol; mixtures of such cresols, e.g., the commercial mixture sold as cresylic acid; polar solvents, e.g., dimethylacetamide, benzonitrile, N-methyl pyrrolidone, etc.

The resin solutions of the invention may be applied as coatings to the desired surfaces in any suitable manner, such as by dipping, spraying, application by rollers and the like and thereafter removing any solvent used by drying in air or heating in an oven. To provide the exposed foil margins as shown in the capacitor electrodes illustrated in FIGURE 1, these areas can be appropriately masked during the coating process. Films may also be made by well known methods such as extrusion, casting, roll forming, and the like. The polymer can be coated directly on the electrode foils from solution or suspension, or by fluidized bed coating methods known in the art. The material may be processed either as such, or with plasticizers such as diphenyl to facilitate processing.

While the dielectric material is shown in FIGURE 2 used alone as the dielectric material, the synthetic resin sheet may be used in conjunction with other materials such as paper and other types of dielectric sheets to provide a complex dielectric spacer system, particularly where the auxiliary spacer material is porous and used for the purpose of enabling improved distribution of impregnating fluids in capacitors. The described dielectric films may have conducting layers deposited thereon by known metallizing processes to provide electrodes on their surface, either when in the form of self-supporting films or in the form of coatings on a metal base. If desired, the dielectric spacer material between capacitor electrodes may be in the form of paper or other porous insulating sheets such as glass cloth, asbestos, or textile cloth impregnated and/or coated with the described resin dielectric composition.

FIGURE 3 illustrates the remarkably improved dissipation factor properties of the described dielectric material as compared to known synthetic resin materials heretofore used as capacitor dielectrics. Curve A represents the polyester poly(1,4-cyclohexylenedimethylene terephthalate) known commercially as Kodar; Curve B represents the polyester known as Mylar, poly(ethylene terephthalate); and Curve C represents the bisphenol polyester employed in the present invention. As will be seen from the graph, wherein the dissipation factor is plotted against temperature, the dissipation factor of the bisphenol polyester of the invention remains relatively low over a wide temperature range of from about room temperature to about 180° C., in contrast to the known materials which undergo sharp rises in dissipation factor at about 90 and 100° C., respectively.

FIGURE 4 shows a comparison of the dielectric constant properties of the same materials. In the graph, dielectric constant is plotted against temperature, and the curves represent the respective materials as designated above. It will be seen that the dielectric constant of the bisphenol polyester employed in the present invention, as represented by Curve C, is substantially higher over a wide temperature range than either of the other materials and is considerably more stable in value over this range.

The bisphenol polyester material may be further modified by cross-linking or otherwise treated to obtain improved or different properties, if desired. Thus, for example, the polyester may be co-esterified with a diphenolic acid in the amount of about 1 to 10 mole percent based on the total moles of bis(hydroxyphenyl)alkane and diphenolic acid, to obtain improved thermal properties. Cross-linking of the polymer may be achieved by other methods, such as by radiation or other techniques well known in the art.

The following are examples of methods of preparation of the modified and unmodified bisphenol polyester for use in the invention, it being understood that the examples given are for illustration only and not to limit the invention in any way:

*Example I*

A mixture was prepared consisting of 3568 grams (11.42 moles) of the diacetate of 2,2-bis(4-hydroxyphenyl)propane, 1900 grams (11.42 moles) of isophthalic acid, and 4098 grams (50% by weight) of chlorinated diphenyl. The mixture was introduced into a 12 liter reaction vessel equipped with a stirrer, thermowell, nitrogen sparge tube, and a condenser set up for distillation. The contents were stirred and heated to 290° C. in about 8 hours. During the next 142 hours the reaction temperature was held between 280 to 285° C. The total reaction time was about 150 hours.

The solid polymer obtained in this reaction was wet milled in acetone a number of times to wash out the chlorinated diphenyl, filtered and vacuum dried at 120° C. for 12 hours. The polymer thus prepared had an intrinsic viscosity in cresol of .65 dl/g. A film 1 mil thick of this polymer was prepared by heating the solid polymer in powder form on aluminum foil at 310° C. for three minutes followed by pressing at 2000 p.s.i. at 310° C. for one minute, followed by rapid quenching in water. The thus formed film was metallized on opposite surfaces by vapor deposition of metallic coatings to form a capacitor unit.

*Example II*

A reaction mixture is prepared and processed as in Example I except that the diacetate of 2,2-bis(3-methyl-4-hydroxyphenyl)propane is substituted for the diacetate of 2,2-bis(4-hydroxyphenyl)propane.

*Example III*

A reaction mixture processed as described in Example I is composed of 3568 grams of pre-formed diacetate of 2,2-bis(4-hydroxyphenyl)propane, 950 grams of isophthalic acid, 950 grams terephthalic acid, and 4098 grams of chlorinated diphenyl.

*Example IV*

A mixture of 500 parts by weight of acetic anhydride, 450 parts of 2,2-bis(4-hydroxyphenyl)propane and 5.7 parts of 4,4-bis(4-hydroxyphenyl) pentanoic acid was heated to the reflux temperature of the reaction mixture for 90 minutes under a nitrogen blanket in a reaction vessel as described in Example I. At the end of this time, the acetic acid and excess of acetic anhydride were distilled from the reaction mixture. Distillation was continued until the reaction mixture reached a temperature of 240° C., at which point the mixture was allowed to cool to ambient conditions. At this point in the reaction, the phenolic starting materials had both been converted to the corresponding diacetates. To this mixture, 331 parts of isophthalic acid and 181 parts of biphenyl were added. Over a period of 230 minutes, the reaction mixture was heated up to the reflux temperature of the reaction mixture. Reflux conditions and the nitrogen atmosphere were maintained during the entire reaction period. Initially, the reflux temperature was 290° C. At the end of 355 minutes the reflux temperature was 300° C., at which point 125 parts of additional biphenyl were added which dropped the reflux temperature to 275° C. A further addition of 170 parts of biphenyl was made after 115 minutes, after which the reaction mixture was heated an additional 105 minutes at a reflux temperature of 160° C. The total reaction period was 805 minutes. The amount of biphenyl was 40% of the total weight of biphenyl and resin. Acetic acid was allowed to distill from the reaction mixture as it was formed during the entire reaction. After cooling the reaction mixture to ambient temperature, the solid mass was broken up into small lumps. The biphenyl was then extracted by acetone from the resin, as in Example I.

While the present invention has been described with reference to particular embodiments thereof, it will be understood that numerous modifications may be made by those skilled in the art without actually departing from the scope of the invention. Therefore, the appended claim are intended to cover all such equivalent variations as come within the true spirit and scope of the invention.

What I claim as new and desire to secure by Letters Patent of the United States is:

An electrical capacitor comprising a pair of electrodes separated by dielectric material, said dielectric material comprising a phthalate polyester of a bis(hydroxyphenyl)-alkane wherein the alkane group contains from 1-5 carbon atoms and the phthalate radical of the polyester is from about 50-100 mole percent isophthalate and from 50-0 mole percent terephthalate radicals, the polyester being co-esterified with 4,4-bis(4-hydroxyphenyl)pentanoic acid in the amount of from 1-10 mole percent based on the total moles of bis(hydroxyphenyl)alkane and diphenolic acid.

References Cited by the Examiner

UNITED STATES PATENTS

| | | | |
|---|---|---|---|
| 2,995,688 | 8/1961 | Rosenberg | 317—258 |
| 3,133,898 | 5/1964 | Keck | 260—47 |

FOREIGN PATENTS

| | | |
|---|---|---|
| 1,266,935 | 6/1961 | France. |

OTHER REFERENCES

Conix, A.: Industrial and Engineering Chemistry, vol. 51, No. 2, pp. 147–50, February 1959.

ROBERT K. SCHAEFER, *Primary Examiner.*

JOHN F. BURNS, *Examiner.*

E. GOLDBERG, *Assistant Examiner.*